United States Patent
Balachandran et al.

(10) Patent No.: US 6,208,642 B1
(45) Date of Patent: Mar. 27, 2001

(54) ARCHITECTURE INDEPENDENT APPLICATION INVOCATION OVER A TELEPHONY NETWORK

(75) Inventors: Shridharan Balachandran, Garland; John Kaippallimalil, Dallas, both of TX (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 08/994,861

(22) Filed: Dec. 19, 1997

(51) Int. Cl.$^7$ .................................................. H04M 7/00
(52) U.S. Cl. ........................................... 370/385; 379/229
(58) Field of Search ..................................... 370/384, 385, 370/400, 401, 355, 352, 259, 410, 522; 379/230, 231, 89, 207, 229, 204, 205, 93.09, 220

(56) References Cited

U.S. PATENT DOCUMENTS

| | | | |
|---|---|---|---|
| 4,899,373 | * 2/1990 | Lee et al. | 379/207 |
| 5,212,789 | * 5/1993 | Rago . | |
| 5,377,186 | * 12/1994 | Wegner et al. . | |
| 5,418,844 | 5/1995 | Morrisey et al. | 379/207 |
| 5,515,427 | * 5/1996 | Carlsen et al. | 379/220 |
| 5,517,562 | * 5/1996 | McConnell | 379/202 |
| 5,541,986 | 7/1996 | Hou | 379/201 |
| 5,602,991 | * 2/1997 | Berteau | 395/200.01 |
| 5,748,710 | * 5/1998 | Lautenschlager | 379/88 |
| 5,812,639 | * 9/1998 | Bartholomew et al. | 379/89 |
| 5,850,433 | * 12/1998 | Rondeau | 379/201 |
| 5,889,848 | * 3/1999 | Cookson | 379/230 |
| 5,898,839 | * 4/1999 | Berteau | 395/200.57 |
| 5,930,700 | * 7/1999 | Pepper et al. | 455/414 |
| 5,953,399 | * 8/1999 | Farris et al. | 379/201 |
| 5,974,252 | * 10/1999 | Lin et al. | 395/701 |
| 6,058,175 | * 5/2000 | Schultz | 379/201 |
| 6,088,434 | * 7/2000 | Kasrai | 379/201 |

FOREIGN PATENT DOCUMENTS

| | | |
|---|---|---|
| 0 669 748 A2 | 2/1995 | (EP) . |
| WO 97/22212 | 6/1997 | (WO) . |

OTHER PUBLICATIONS

DGM&S Telecom, *The Programmable Network*™, White Paper, Jun. '97.

Modarressi & Skoog, *An overview of Signaling System No. 7*, IEEE, Proceedings of the IEEE, vol. 80, No. 4, Apr. 1992, pp. 425–441.

* cited by examiner

*Primary Examiner*—Douglas Olms
*Assistant Examiner*—Ken Vanderpuye
(74) *Attorney, Agent, or Firm*—Jenkens & Gilchrist

(57) ABSTRACT

A telephony network that includes a signaling system that provides intelligent network services. The signaling system includes a service control point that interfaces with an application database. The application database includes subscriber defined applications that are associated with an application code. The signaling system includes a service switching point in communication with the service control point through one or more signaling transfer points. Subscribers to the service may communicate through voice traffic and applications over a call connection. The applications may reside in the application database or in a subscriber. A subscriber may utilize a network computer to retrieve platform independent applications and associated initiate applications for execution in a highly secure environment.

35 Claims, 5 Drawing Sheets

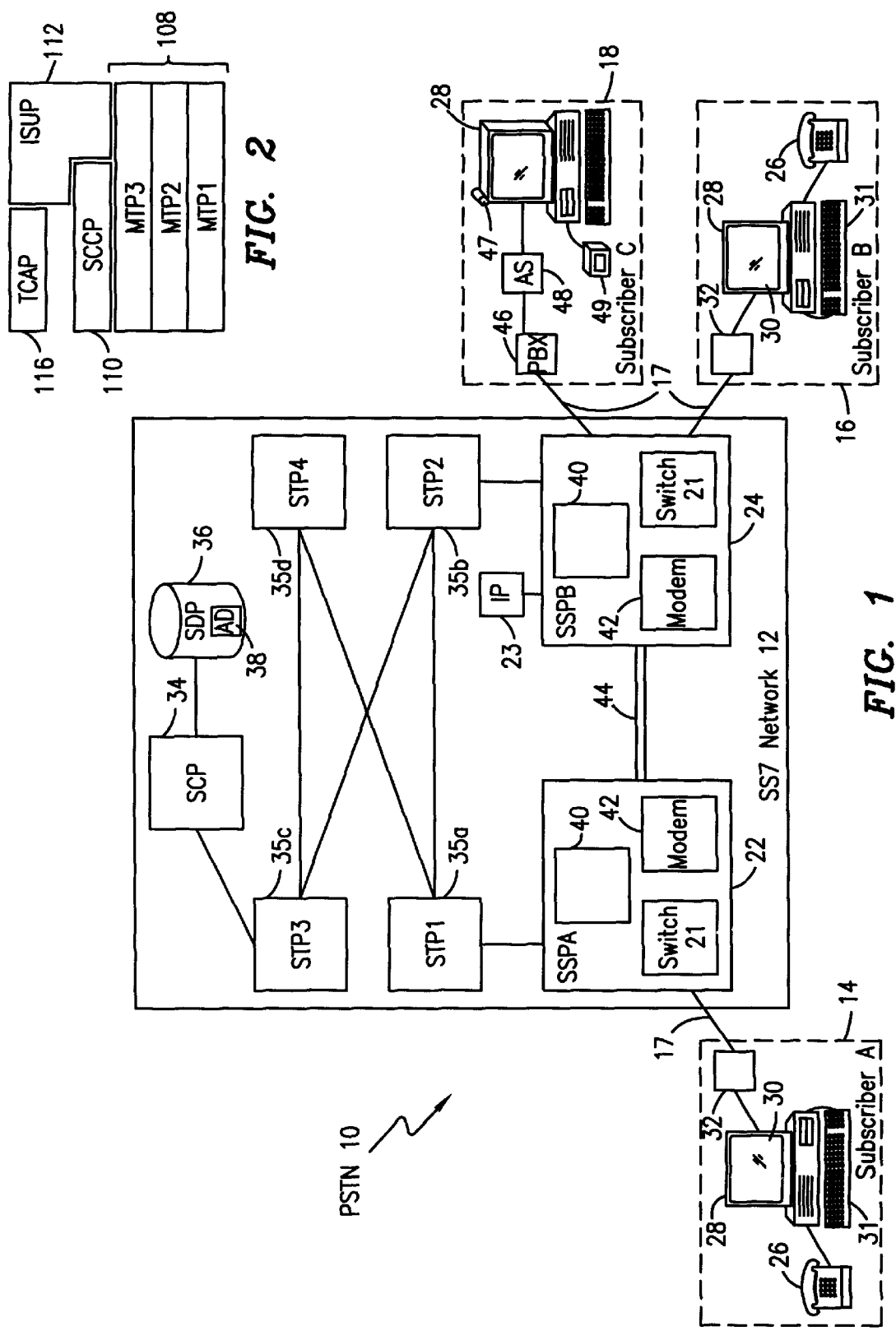

ARCHITECTURE INDEPENDENT APPLICATION INVOCATION OVER A TELEPHONY NETWORK

BACKGROUND OF THE INVENTION

1. Technical Field of the Invention

The present invention relates to a telephony network, and more particularly to systems and methods for invoking an application stored in an intelligence network node of the telephony network.

2. Background of the Invention

The Internet is based on the TCP/IP protocol suite. IP or Internet Protocol specifies the addressing of nodes on the Internet and a method of sending packets of data from one node to another. The TCP or Transmission Control Protocol is an application implemented on top of IP to provide reliable delivery of the data packets. Users of the Internet generally utilize a web browser to locate files using the TCP/IP protocols. A web browser is a program residing on the user's computer that can retrieve and display files, and follow links to other files. A web browser generally supports networking, a graphical user interface, and the ability to execute remote programs. Using a web browser and the TCP/IP protocol, users may specify an address of a file, the URL or Uniform Resource Locator, on the Internet and have the file downloaded to their computer. In addition, a web browser may search for files by key words. The web browser will locate and list the URLs of files which include those key words.

Once a subscriber selects to access a URL address, the web browser retrieves the file specified by that URL address, commonly known as a "web page". Web pages are typically files in HTML (Hypertext mark-up language) format. The HTML file can include hypertext, i.e. embedded links to other files. When the HTML file is downloaded to a user's computer, the user may download other linked files by selecting an icon or other marker for the linked file.

A web browser may also access applications over the Internet. There are three different methods for execution of applications. First, the source code for small applications may be embedded in the HTML file. As the browser reads the HTML file, it formats the text onto the screen. When it finds a tag indicating the source code of a small application embedded within the HTML file, the browser executes the source code of the application. Second, the HTML file of a web page may point to the URL of a CGI (Common Gateway Interface) script. A CGI script is an executable program which runs on a server and processes data sent from an HTML file and returns data to the client in HTML format. To collect data, the HTML file includes form tags, and a collection of related tags to specify various formats for fields of data. A user may enter data in the fields and then submit the "form" to a server designated by a URL in the HTML form tags. Finally, there are special tags in HTML files that point to URL's of applications which reside in servers connected to the Internet. The HTML tags informs the browser where to locate the application and to download and run it. Thus, the application is executed by the user's computer rather than a server.

Often, the executable programs which are downloaded (and those which are embedded within the HTML files) are written in architecture or platform independent languages. Examples of architecture independent languages include the JAVA™ technology from Sun MicroSystems, Inc. of Cupertino, Calif., the LIMBO™ language from AT&T and somewhat for Windows based platforms, ACTIVE X™ technology from Microsoft Corporation of Redmond, Washington. Programs written in architecture independent languages may be run on various types of platforms, regardless of hardware or software. For example, if an application is written in JAVASCRIPT™, any web browser or computer system that includes a JAVA VIRTUAL MACHINE™ may execute the program. The JAVA VIRTUAL MACHINE interprets the JAVA program into code that the platform may execute. Though the JAVA VIRTUAL MACHINE may be different for different platforms, a program written in JAVA may be run by any platform which has a JAVA VIRTUAL MACHINE installed. As a result, the JAVA program, and thus the web page or HTML file, does not need to be platform specific but may be run by any platform, regardless of the underlying operating system or hardware.

Though the Internet provides access to a wide variety of information and applications, the Internet has a plethora of security problems. The HTML files of a web page may sometimes be modified by unauthorized persons. One estimate is that over 60% of web sites have vulnerabilities that allow unauthorized access or file removal. Thus, a user must always be cautious when downloading a file in case the web page has been altered or viruses embedded within the web pages. In addition, companies who have web pages, must monitor their content daily to ensure no unauthorized alterations have occurred. In addition, certain systems are vulnerable to attacks over the Internet. For example, one application of IP called "ping" allows a user to send an IP packet and ask for an acknowledgment. If an oversized ping packet is sent to certain systems, the system will crash when it tries to assemble the packet.

Another disadvantage is that not all persons have access to the Internet. Often, access to the Internet entails paying an Internet Service Provider (ISP) a monthly fee or a fee based on time spent on-line. Even if a person has access, due to traffic overload, it is frequently difficult to log onto the Internet. Moreover, a computer system is expensive and not all households can afford a desktop PC.

Due to the aforementioned security and access problems of the Internet, a need has arisen in the industry to provide information and applications to a client/user through more secure methods and networks.

SUMMARY OF THE INVENTION

The present invention is directed to a telephony network in which applications are stored in a node of a signaling network in a telephony network. Subscribers may request and download applications over the telephony network during a voice call. Thus, both parties to the voice call may access and exchange information using applications invoked over the telephony network and concurrently communicate orally with each other over the same trunk connection. The telephony network includes at least one combined voice and data switch in a local exchange connected to a plurality of subscribers and a signaling network for providing signaling within the telephony network and interface with other such networks. The signaling network includes an application database that stores applications, a service control point (SCP) for interfacing with the application database, and one or more signaling transfer points in communication with the service control point. (In addition, the signaling network includes a service switching point in communication with the service control point through the signaling transfer points and connected to the local exchange which has voice and data capability). The service switching point receives an application code inputted by a party to the call, and sends the request as in a call to the SCP. The SCP then retrieves the application associated with the application code from the application database and downloads the application to the callers. The service control point may include an application look-up table for locating the applications stored within the application database.

In operation, the signal switching point receives an application code inputted by a party to a call in the telephony network. The signal switching point determines whether the parties connected to the call have the capability of communicating in a voice and data mode. This is achieved by accessing their respective subscriber call records in the telephony network. If the parties have the capability, the signal switching point tries to identify who owns the application code. The network for the called party then establishes a trunk connection between the parties and determines whether an application associated with the application code resides within the telephony network or within control of one of the parties to the call. If the application resides within the telephony network, the signal switching point retrieves the application associated with the application code from the application database and downloads the application from the application database in the telephony network to both parties to the call over the trunk connection. If the application resides in the control of one of the parties to the call, the switching signal point retrieves an initiate application download associated with the application code from the application database and downloads the initiate application to the party with control of the application. The initiate application or applet initiates downloading of the application associated with the application code to the other party over the trunk connection.

The signal switching point retrieves the applications by transmitting a message to the service control point including the specific code for the application. The service control point determines whether the application code is a specific or generic code associated with an application. If the application code is generic, the service control point obtains the specific code associated with the application by transmitting an instruction to an intelligent peripheral to query the caller for the specific code associated with the application. The signal control point retrieves the application associated with the specific code in the application database, and transmits the application to the signal switching point in one or more messages, such as in Signaling System Seven (SS7).

Once a trunk connection has been established and initial applications downloaded, the parties may use the applications to exchange information, communicate with each other orally, request additional applications to be transferred over the trunk connection, save data from the applications to a local hard disk, etc. The applications may also automatically request additional applications, as needed.

BRIEF DESCRIPTION OF THE DRAWINGS

For a more complete understanding of the present invention and for further objects and advantages thereof, reference may now be had to the following description taken in conjunction with the accompanying drawings, in which like numerals are used for similar parts:

FIG. 1 illustrates a telephony network of the present invention;

FIG. 2 illustrates a block diagram of the protocols of the SS7 network in the telephony network of the present invention;

DETAILED DESCRIPTION OF THE INVENTION

Figure 3A:
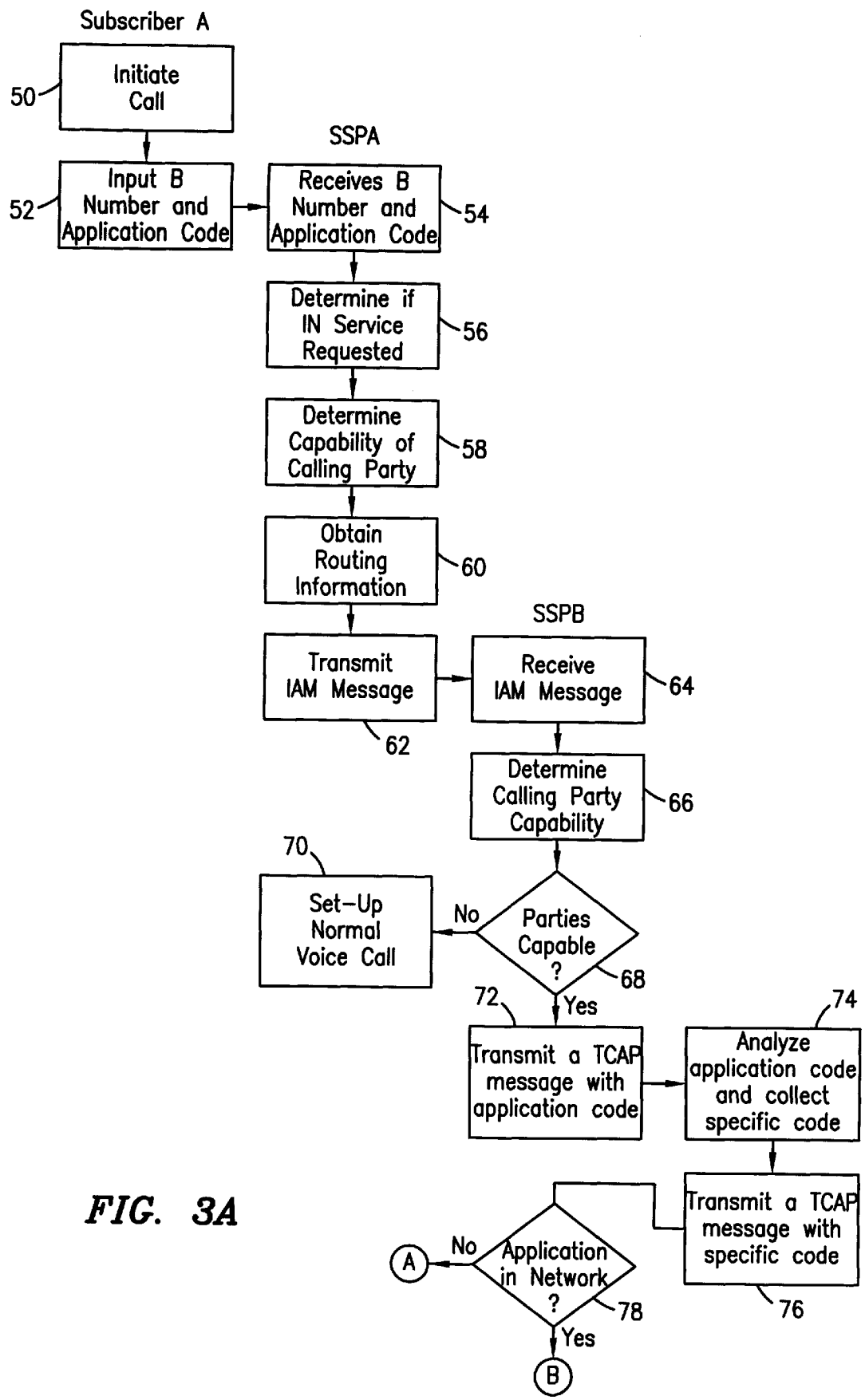
FIGS. 3A, 3B and 3C illustrate steps in a flow chart of the process of the present invention during a call connection.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In FIG. 1, a telephony network of the present invention is illustrated, and generally referred to by the reference numeral 10. For example, a public switched telephone network (PSTN) 10 includes a Signaling System No. 7 (SS7) network 12 which provides signaling within the PSTN 10 in accordance with SS7 protocol standards.

Connected to the PSTN 10 are a plurality of subscribers. Each subscriber is connected to the PSTN 10 through an access network. FIG. 1 illustrates three subscribers, SubscriberA 14, SubscriberB 16, and SubscriberC 18. SubscriberA 14 is connected to a service switching point A (SSPA) 22 in the SS7 Network 12 through access network line 17 while SubscriberB 16 and SubscriberC 18 are connected to a service switching point B (SSPB) 24 through access network lines 17. The access network lines 17 may be common POTS (Plain Old Telephone System) lines or preferably Integrated Services Digital Network (ISDN) lines. If lines 17 are ISDN lines, the ISDN service is typically either basic rate interface (BRI) or primary rate interface (PRI). BRI includes two bearer or B channels operating at 64 Kbps and one packet switched data or D channel operating at 16 kbps. PRI includes 23 B channels and one D channel operating at 64 Kbps. The D channel performs signaling for the B channels and furnishes a mechanism for packet switching user data. Thus, with ISDN service, SubscriberA 14 and SubscriberB 16 may transmit and receive voice and data traffic concurrently over lines 17 respectively.

SubscriberA 14 and SubscriberB 16 both have a telephone 26 and computer 28. The telephone 26 is connected to the PSTN 10 through a modem in the computer 28 or alternatively, the computer 28 and telephone 26 are connected to the PSTN 10 through an external modem 32. The internal modem in the computer 28 or the external modem 32 allow the computer 28 to receive data traffic from the PSTN 10 and the telephone 26 to receive voice traffic. Alternatively, the computer 28 may incorporate the functions of the telephone 26. For example, the computer 28 may include a microphone and speakers and software to function as a telephone 26. The computer 28 may be a desktop PC or preferably a network computer (NC). A network computer costs less than a desktop PC and are less expensive to administer in a client/server environment. A typical network computer has sufficient processing power for executing programs locally, using data and programs transmitted to it, a pointing device, text input capabilities, and an audio output. The network computer may or may not include a disk drive. Some network computers include NETWORK STATION™ manufactured by IBM Corporation and JAVASTATION 1™ from Sun Microsystems of Cupertino, Calif.

The computer 28 also includes a display 30 for viewing data and a keyboard 31 or other input device. Alternatively, the computer 28 may include a signal converter to convert video signals suitable for display on a monitor, such as VGA signals, to a video signal, such as the National Television Committee (NTSC) interlaced signal. The computer 28 may then display information and data on a television rather than a monitor 30.

The computer 28 also includes software or hardware (such as a JAVA VIRTUAL MACHINE or browser that incorporates a JAVA VIRTUAL MACHINE) that can allow the computer 28 to execute a program written in an architecture independent language.

SubscriberC 18 is connected to the PSTN 10 through a private branch exchange (PBX) 46, as is understood in the art. The PBX 46 directs an incoming call to one of a plurality of computers 28. An application/data server 48 is also attached to the PBX 46. The application/data server (AS) 48 may provide such services as voice mail or an interactive voice response unit to collect or provide information from incoming callers. Each computer 28 has a microphone 47 and speaker 49 to communicate with incoming callers. Alternatively, computer 28 may be attached to a telephone 26. The computer 28 may be a network computer or a desktop personal computer or a server with connections to other clients.

The SSPA 22 and SSPB 24 are connected to the subscribers within the SS7 network 12. The SSPA 22 and SSPB 24 are the local exchanges in the PSTN 10. The SSPA 22 and SSPB 24 has voice and data capability, such as through switch 21,or the SSPA and SSPB 24 are adjunct computers to a voice and data switch. The SSPA 22 and SSPB 24 initiate signals related to voice/data and convert them from the voice and data switch into SS7 signaling messages which are sent to other exchanges throughout the SS7 network 12.

The SSPA 22 and SSPB 24 send two types of messages: circuit-related and database queries. Circuit-related messages are used to connect voice and data circuits from one exchange to another exchange. The SSPA 22 and SSPB 24 use ISDN User Part (ISUP) or other such protocol messages to perform many of these functions. ISUP messages are used to set up and tear down voice and data circuits in the PSTN 10. A database query provides access to the Intelligent Network (IN) and other databases within the SS7 network 12. Preferably, all database queries are performed using Transaction Capabilities Application Part (TCAP) protocols.

FIG. 2 illustrates a schematic of the protocols in the SS7 network 12. The first three layers are called the "lower layers" and include message transfer part 1 (MTP 1), message transfer part 2 (MTP 2), and message transfer part 3 (MTP 3). MTP 1 is the actual physical link of the network, such as twisted wire pairs, fiber optic cable, etc., and corresponds to the physical link in the Open System Interconnection (OSI) reference model recommended by the International Organization for Standardization (ISO). MTP 2 corresponds to the data link layer in the OSI model and provides the basic data transmission services for messages while MTP 3 provides basic routing of messages. Collectively, MTP 1, MTP 2, and MTP 3 are called the lower layers. Each message in the PSTN network includes a set of information elements to code the basic functions of the lower layers 108. The MTP layers are only capable of point-to-point routing in the PSTN network 10.

With further reference to FIG. 2, the signaling connection control part (SCCP) 110 provides additional end-to-end routing services and along with MTP 3 corresponds to the network layer of the OSI model. The address of the SCCP provides additional information such as the called/calling party and is used by the MTP to determine the next node in the message route.

The ISDN user part or ISUP 112 (also known as ISDN-UP) interfaces with the lower layers directly or through the SCCP to provide supplementary services, as is understood in the art. Such supplementary services include caller identification, call forwarding, and user-to-user signaling.

As discussed, the transaction capabilities application part (TCAP) 116 is used to access remote databases and invoke features in remote network entities. The message units within TCAP 116 have two parts: the transaction part and the component part. The transaction part provides management and information for routing the TCAP message to its destination and includes a transaction ID which is used to identify TCAP messages included within a single transaction. The transaction part manages each transaction identified with a unique transaction ID and groups components into BEGIN, CONTINUE, END and ABORT messages. The component part contains the commands and information necessary for the operation, such as a database query. The following types of components are found within the component part: Invoke, Return Result, Return Error, Reject.

The ISUP 112, TCAP 116 and SCCP 110 are collectively known as the higher layers of the network interface. These higher layers have separate message information fields, from that of the lower MTP layers, for use in the PSTN network 10 to code various features and functions of their services.

Referring again to FIG. 1, the SSPA 22 and SSPB 24 in the PSTN network 10 each include an application message buffer 40 that stores applications when received, as described in more detail hereinafter with respect to FIG. 3A. SSPA 22 and SSPB 24 also each include a bank of modems 42 that allow the respective SubscriberA 14 and SubscriberB 16 to communicate voice and data traffic concurrently in the same call using a feature similar to a phone doubler system when one or more of the lines 17 are POTS lines rather than ISDN lines. Although the phone doubler system is typically implemented with a voice gateway in an Internet Service Provider (ISP) server, interrogatory the embodiments of the present invention the phone doubler voice gateway is provided by the bank of modems 42 in the SSP's 22 and 24 of the PSTN 10. The phone doubler system establishes a voice gateway that allows voice calls to be sent over the access network lines 17 while the user is receiving data traffic over lines 17. The user is alerted to the incoming call with an icon on the computer screen, and can take the call using the computer's microphone or speaker or the telephone 26 while still using or accessing applications. The voice is encoded like in a GSM system and down/up loaded as data. The voice (encoded) is then separated at the receiver and sent to the microphone. The SS7 network 12 also preferably includes an intelligent peripheral (IP) 23 connected with SSPB 24, though a person of skill in the art would appreciate that the IP may be a separate addressable mode.

The SS7 network 12 shown in FIG. 1 further includes four signaling transfer points, STP1 through STP4 (35a–d), though a person of skill in the art would appreciate that any number of STPs may be implemented within the SS7 network 12. The STP1 through STP4 in FIG. 1 are shown in a mesh or quad signaling network structure, a configuration typical of North America. However, the SS7 network 12 may alternatively comprise other signaling network structures. The STPs serve as routers and gateways in the SS7 Network 12. The STPs are typically associated or adjunct computers to voice and data switches in the PSTN 10.

The STPs are connected to a service control point SCP 34. The SCP 34 serves as an interface to databases within the SS7 Network 12. These databases are used to store information about subscriber's services, routing of special service numbers, calling card validation and fraud protection. These services are part of the Intelligent Network (IN). The IN provides services such as 1-800 numbers translation. Currently, the International Telecommunications Union (ITU) and American National Standards Institute (ANSI) have issued standard protocols for IN services. The present invention may require extensions to the existing IN protocols, in particular to the IN application (INAP) protocols, to support the additional services of the present invention, as explained with reference to FIGS. 2 and 3.

The SCP 34 is connected to a service data point (SDP) 36, which provides the aforedescribed database of information and data to support the IN services. Though the SDP 36 is shown as a separate node within FIG. 1, the SDP 36 and its functions may be incorporated as a part of the SCP 34. Besides the typical databases found within the SDP 36 (such as Line Identification Database, Call Management Services Database and Business Services Database), the SDP 36 includes an application database (AD) 38. The application database 38 includes various applets, programs, other applications, as described in more detail below. The applications are preferably written in an architecture independent language such that a single version of an application may be run on many types of platforms.

The operation of the present invention is now described with reference to FIGS. 3A, 3B and 3C which illustrate a block diagram of the steps performed during a voice/application call initiation in the present invention. FIG. 3A illustrates the initial steps in a call connection for any call. FIG. 3B illustrates the completion of a call connection in which applications and data for the call reside within application/data server of the called party while FIG. 3c illustrates a call in which applications and data for the call reside within the telephony Network 12.

Figure 3B:
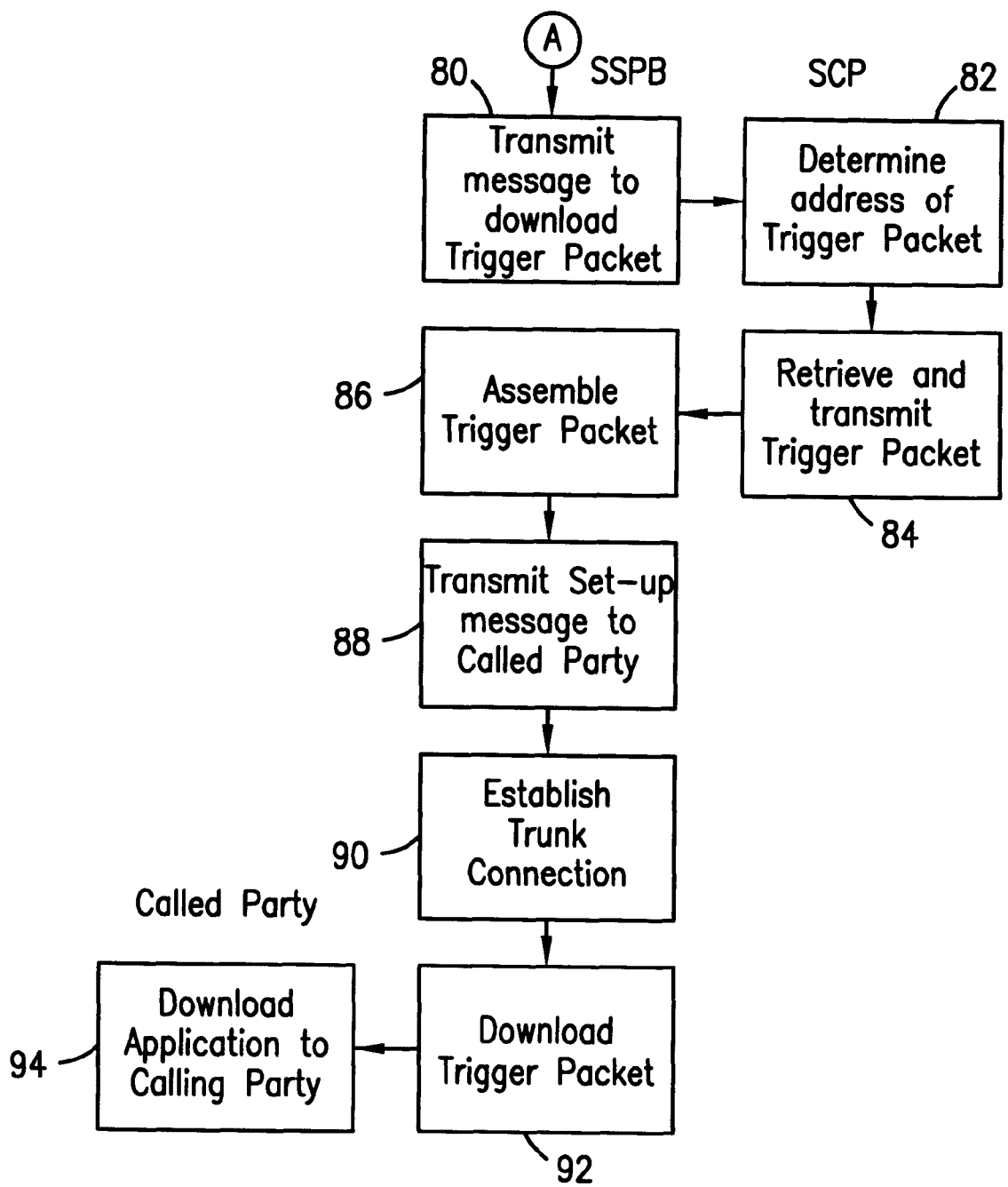
Figure 3C:
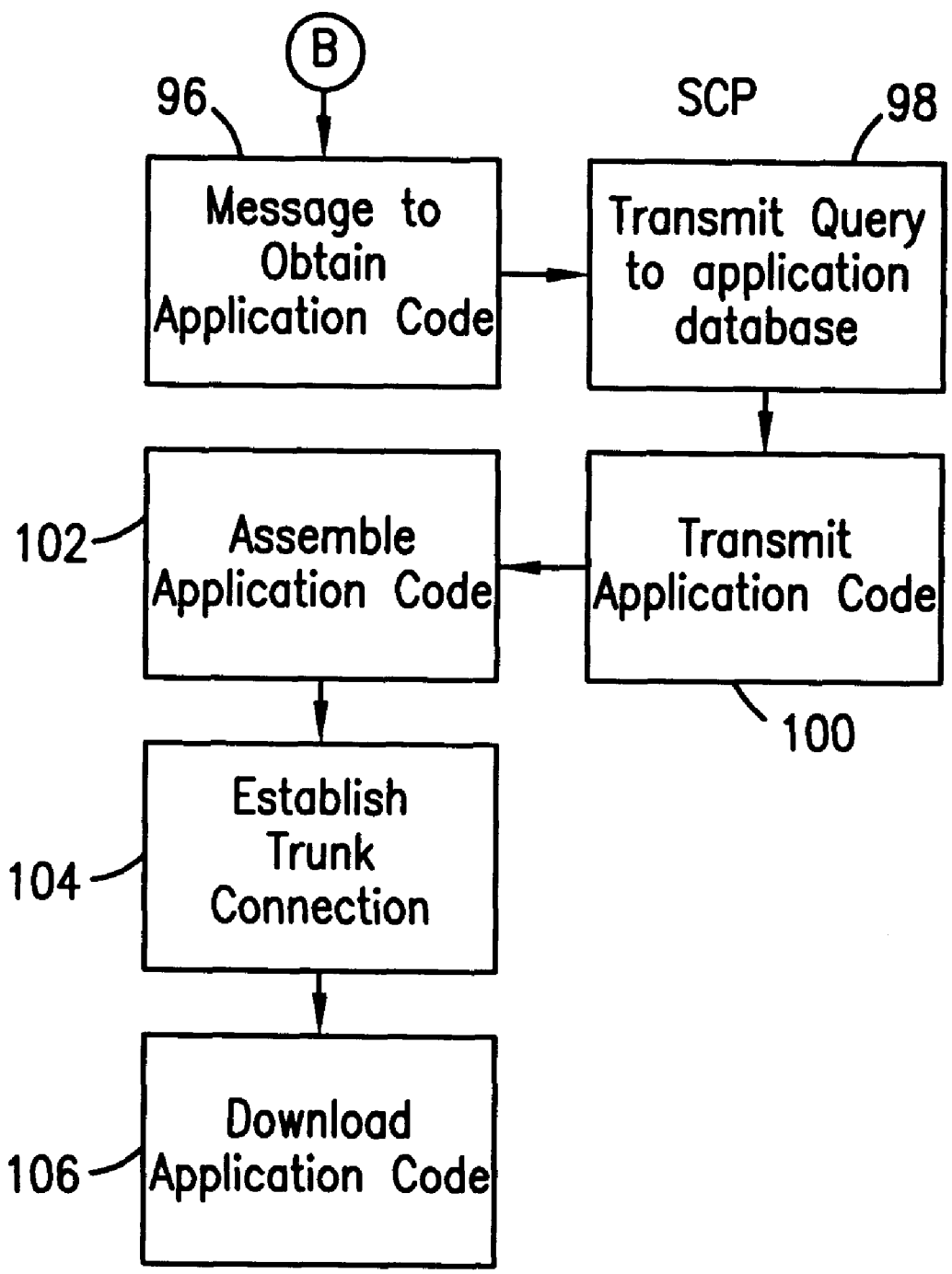

First, for the example embodiment of FIGS. 3A and 3B, SubscriberA 14 is the originating or calling party and SubscriberC 18 is the called party. In step 50, SubscriberA 14 initiates a call to SubscriberC 18. SubscriberA 14 may lift a receiver of the phone 26 or initiate the call through computer 28. The SubscriberA 14 then inputs a B number, i.e., the seven digit telephone number of the called party and, if needed, area code, and an application code, as depicted in step 52. The application code (such as 0100) signals the SSPA 22 that the SubscriberA 14 is attempting to access an IN service. In step 54, the SSPA 22 receives the inputted B number and application code. Typically, in many PSTN 10 architectures, the SSPA 22 is located within the local exchange or an adjunct node to the local exchange in the PSTN 10. The SSPA 22 collects the inputted digits and performs a B number analysis in step 56. In particular, the SSPA 22 compares the application code to a table of codes in an IN trigger table. If the application code matches an application code in the IN trigger table, the SSPA 22 knows that SubscriberA 14 is attempting to invoke an application and voice call within the IN, and to determine the call capabilities of the calling party.

In step 58, the SSPA 22 determines if the calling party supports voice and data traffic. The voice and data capability is checked to ensure that the caller has the physical capability to engage in the voice/application call and is a subscriber to the service to receive voice/application calls. Each subscriber has a Subscriber call record stored in the SSP. The subscriber call record contains all the information/options subscribed to by the customer. The SSPA 22 accesses the Subscriber call record and determines from the information if SubscriberA 14 has the capability to engage in a voice/application call and is a subscriber to the service. If not, the SSPA 22 sets up a trunk connection for a normal voice call using the routing information. If SubscriberA 14 does support voice and data traffic, the SSPA 22 continues to set up an application and voice call.

In addition, in step 60, if the dialed number is a 1-800 number, 1-900 number or other number requiring additional routing information, the SSPA 14 determines the additional routing information for such number. The SSPA 14 queries the SCP 34 in a TCAP BEGIN message that invokes the process to provide the routing of the number. The SCP 34 determines the routing information by interfacing with the SDP 36 and returns the information to the SSPA 22 in a TCAP END message. Step 60 is shown in dashed lines because it is only performed when the SSPA 22 needs routing information on the B number.

Assuming that the SSPA 22 determines that the application code matches an application code in the IN trigger table, in step 56, and that the calling party supports voice and data calls in step 58, the SSPA 22 sends an ISUP message, such as an initial address message (IAM) message, to the terminating SSP, in this case SSPB 24, with the collected information, as shown in step 62. The IAM message specifies the application code, the capability of the calling party, and the routing information on the B number. The SSPA 22 also transmits the A number, i.e., the calling party's seven digit number and area code.

The SSPB 24 receives the message in step 64. The SSPB 24 determines from the application code that an application/voice call is requested and, in response, determines the capability of the called party. The SSPB 24 accesses the subscriber call record for the called party, in this example SubscriberC 24, and determines from the information if SubscriberC 24 has the physical capability to engage in an application/voice call and is a subscriber to the service. Since SubscriberC 24 has established an application code within the SS7 Network 12, in most circumstances SubscriberC 18 will support voice and data traffic. However, if SubscriberC's application server 48 is down or the service subscription has expired or other circumstances prevent the establishment of a data connection, the SSPB 24 will determine in step 66 that SubscriberC is not capable of establishing an application/voice call.

In step 68, the SSPB 24 determines if the parties to the call have the capability to engage in a voice and application call. If either the SubscriberC 18 or SubscriberA 14 do not have the capability for an application/voice call in step 68, then SSPB 24 will set-up a normal voice call, as shown in step 70. If the subscribers do have the requisite capability in step 68, then the SSPB 24 will continue to set-up an application/voice call.

Alternatively, in order to determine capabilities of the called party, the SSPA 22 may transmit a TCAP message to the SSPB 24 with a query as to the capability of the called party and if the called party is a subscriber to the service. If the called party meets the requirements, then in a reply TCAP message, the SSPB 24 may indicate that it will provide the necessary support for the voice/data call, and the trunk connection will proceed to be established, as described below. If the called party fails to have the necessary capability or is not a subscriber, the SSPB 24 will send a response to the SSPA 22 rejecting the voice/application call, and the SSPA 22 will then proceed to establish a typical voice call.

In step 72, the SSPB 24 transmits a TCAP BEGIN message to the SCP 34 with an invoke component that specifies the application code inputted by SubscriberA 14. In step 74, the SCP 34 analyzes the application code and determines if the application code is a generic application code that refers to a set of specific applications. The SCP 34 may access the application database (AD) 38 within the SDP 36 to look-up the application code in an application code database table, as shown in Table 1 below.

If the application code is generic, the SCP 34 responds to the TCAP BEGIN message with a TCAP CONTINUE message to the SSPB 24 to play a certain announcement or other interactive voice response to collect additional digits from SubscriberA 14, as depicted in step 76. This process may include using the aforementioned Intelligent Peripheral (IP) 23 that interfaces with the SCP 34 to provide interactive voice responses. The IP 23 is shown in FIG. 1 as connected to SSPB 24. The IP 23 is collocated with the SSPs or it may be a separate addressable node in the SS7 Network 12, depending on the network operators' configuration. The IP 23 includes an interactive voice response unit that queries a caller for more information on the application requested, such as the specific application desired, and collects the user dialed digits in response to the queries.

Once collected by the IP 23, the IP 23 transmits the specific application codes to the SSPB 24 as user dialed digits. The SSPB 24 performs the required actions and sends a CONTINUE TCAP message to the SCP 34 with a Return Result component containing the collected digits. The SCP 34 accesses the SDP 36 and determines the specific application code based on the collected digits from an application code database table or other database within the SDP 36. Alternatively, the application code database table may reside within the SCP 34. An example of an application code database table is shown in Table 1 below. In Table 1, a generic code for two subscribers to the application service are shown: ABC Airlines (1-800-555-1234) and XYZ Computer Store (1-214-555-7890). The generic code includes one or more specific codes as shown in Table 1 below for ABC Airlines. However, XYZ Computer Store has only one application and thus no specific codes are referenced by the generic code. Table 1 may also include other information regarding the applications such as whether the applications reside within the SS7 Network 12, the address of the Trigger Packet (described below) for the application, the size of the application, etc.

TABLE 1

Application Code Database Table

| B Number | Generic Code | Specific Code | Description | Address |
| --- | --- | --- | --- | --- |
| 1-800-555-1234 | 0100 | 0001 | Flight Arrival Information | SDP/AD 1230h |
| 1-800-555-1234 | 0100 | 0002 | Flight Departure Information | SDP/AD 1330h |
| 1-800-555-1234 | 0100 | 0003 | Ticket Purchase | SDP/AD 1670h |
| 1-800-555-1234 | 0100 | 0004 | Freight Information | SDP/AD 1900h |
| 1-214-555-7890 | 1000 | | Computer Sales | SDP/AD 2300h |

In step 76, the SCP 34 transmits an END TCAP message to the SSPB 24 with the Return Result component containing the specific application code and other relevant information regarding the application, such as whether the application resides within the network or within the terminating party, In step 78, the SSPB 24 receives the END TCAP message from the SCP 34 and determines from the Return Result components in the message whether the specific application requested by SubscriberC 18 resides within the control of the SS7 Network 12 or within the control of the called party. If the application code resides within the control of the called party, in this case SubscriberC 18, the process follows the steps in FIG. 3B (path A). If the application resides within the control of the SS7 Network 12 (such as in SDP 36), the process follows the steps in FIG. 3C (path B). In the present example, SubscriberA 14 has called SubscriberC 18, and the application resides within the control of SubscriberC 18. Thus, the process continues to path A in FIG. 3B.

In FIG. 3B, the present invention implements an application and voice call in which the application is within the control of the called party. In step 80 of FIG. 3b, the SSPB 24 transmits a TCAP BEGIN message to SCP 34 with an invoke component to download a Trigger Packet associated with the specific application code. The TCAP message includes the code of the specific application. In step 82, the SCP 34 accesses the application code database table within the SDP 36 and determines from the application code database table the starting address for the Trigger Packet for the specific application. The SCP 34 retrieves the Trigger Packet from the application database 38 and transmits the Trigger Packet to the SSPB 24 in one or more SCCP XUDT/LUDT or UDT signaling messages as necessary, as depicted in step 84. Since the Trigger Packet may be lengthy, the SCP 34 may transmit the Trigger Packet in several subpackets in separate SCCP XUDT/LUDT or UDT messages. Each message within a transaction has the same invocation number, such that the SSPB 24 may discern the query to which a response belongs. In addition, the messages indicate the number of messages and the correct order of the messages for subsequent reassembly. The SSPB 24 assembles the entire Trigger Packet and stores the Trigger Packet in message buffer 40, as shown in step 86.

In step 88, in response to the IAM message sent in step 62 of FIG. 3a from the SSPA 22, the SSPB 24 sets up trunk 44 and any intervening trunks necessary to establish a connection between SSPA and SSPB. In addition, the SSPB 24 transmits a set-up message to SubscriberC 18 on the D-channel (if the SubscriberC has ISDN service) in step 88. The set-up message includes an application download message to SubscriberC 18. The set-up message specifies the specific application code and the calling party capability. The SubscriberC 18 sends an alert message to the SSPB 24 acknowledging the requested call.

In step 90, the SSPB 24 completes the establishment of a voice and data trunk connection between the subscribers. The SSPB 24 generates and launches an Address Complete Message (ACM) to the SSPA 22 requesting a voice and data connection (or just a voice connection per step 84). In response to the ACM message, the SSPA 22 sends an alert message to SubscriberA 14. When SubscriberC 18 answers the call, a connect message is received on the D-channel at SSPB 24. The SSPB 24 transmits an ISUP Answer Message to be sent to the SSPA 22. The SSPA 22 then transmits a Connect message to SubscriberA 14. This process establishes a trunk connection between SubscriberA 14 and SubscriberC 18.

In response to the call connection, the SSPB 24 transmits the Trigger Packet to SSPB 24 through the trunk connection in step 92. The SSPB 24 downloads the Trigger Packet to the application/data server 48 in SubscriberC 18 over the D-Channel of the ISDN lines or through the POTS lines using the phone doubler system. When the called party has control of the application, as in this process of FIG. 3b, the Trigger Packet associated with the application code may only include an initiate application. The initiate application is preferably written in an architecture independent language and initiates the download of Application Code from the application/data server 48 at SubscriberC 18 to SubscriberA 14 over trunk 44 through the call connection.

The Application Code downloaded by SubscriberC 18 to SubscriberA 14 preferably includes a communication protocol application that communicates the capabilities and parameters of the call, such as data rate, asynchronous, non-transparent, etc. The communication protocol application also specifies a protocol, such as file transfer protocol (ftp), tftp, or rpc, for the subscribers to use to communicate files. Alternatively, the communication protocol application may be downloaded with the Trigger Packet. The IN service designer may specify the protocol to use and ensure that the subscribers are aware of and support the protocol.

In addition, the Application Code downloaded from SubscriberC 18 may include a graphical user interface (GUI) application, such as an HTML form file or other type of file. The GUI application controls the display of information on computer 28 of SubscriberA 14. The three main applications described above (GUI, communication, and initiation applications) are merely one example of the applications that may be used to implement the present invention. Each service designer may select how to present various applications to a subscriber.

In step 94 of FIG. 3B, SubscriberC 18 downloads the application to SubscriberA 14 through the trunk connection 44 and ISDN lines 17 shown in FIG. 1. If access network lines 17 are ordinary POTS lines, the application may be downloaded through the bank of modems 42 using the phone doubler system. It should be understood that the phone doubler could also be a POTS with ADSL DMT, which divides the line into subchannels and facilitates the transfer of voice and data at the same time. Alternatively, if line 17 to the SubscriberA 14 is only a POTS line but SubscriberA 14 has a connection to the Internet through an ISP with the aforementioned phone doubler system, then SubscriberC 18 may download the application through the ISP to the SubscriberA 14 using the phone doubler system. A person of skill in the art would appreciate that there may be other methods of communicating voice and data traffic over POTS lines as well.

Once the application code is downloaded to SubscriberA 14, a browser (or other programs or hardware which can interpret an architecture independent language) runs the communication protocol application such that information may be exchanged between SubscriberA 14 and SubscriberB 16. The browser displays the information, pictures or text, as indicated by the GUI application. The GUI application is preferably an HTML file with links to other HTML files or applications which SubscriberA 14 may download from SubscriberC 18. The GUI application may also be a form HTML file in which SubscriberA 14 enters various data for processing by a CGI script running in application/server 48 of SubscriberC 18. The GUI application may also include applications that are run by the browser on computer 28 of SubscriberA 14. Further description of a call in progress is provided with respect to FIG. 4.

FIGS. 3A and 3C illustrate the steps performed by the present invention when an application is within the control of the SS7 Network 12. For example, if SubscriberA 14 calls SubscriberB 16, then the steps described above in FIG. 3a are again performed. As described above with respect to FIG. 3a, SubscriberA 14 inputs a B number, i.e., the seven digit number of the called party, and an application code. The originating SSP, SSPA 22, then performs a B number analysis and determines from the application code that an application/voice call is requested. If SubscriberA 14 has the requisite capability, as determined in the subscriber call record, the SSPA 22 transmits an ISUP message to the terminating SSP, again SSPB 24 in this example, with the application code, the capability of the calling party and B number. The SSPB 24 determines the capability of the called party, and if both parties have the capability to perform the operations, the SSPB 24 transmits a TCAP message to the SCP 34 with the application code. The SCP 34 collects specific application codes from the caller if the application code is generic, and returns the specific code along with other information regarding the application to the SSPB 24. However, in this example, the SSPB 24 determines that the specific application requested by SubscriberA 14 resides within the control of SCP 34, in step 78, and the process proceeds to step B shown in FIG. 3c.

In the first step 96 of FIG. 3c, the terminating SSP, SSPB 24 in this example, transmits a TCAP BEGIN message to SCP 34 to fetch the Application Code associated with the specific application code inputted by SubscriberA 14. In step 98, the SCP 34 receives the message and in response, sends a query to the application database (AD) 38 in the SDP 36 to retrieve the Application Code from the application database 38. The SDP 36 may access an application database look-up table similar to that shown in Table 1 to determine the location and address of the Application Code. Once retrieved, the SCP 34 transmits the Application Code to the SSPB 24 through one or more SCCP UDT/XUDT/LUDT messages, as shown in step 100. The SSPA 22 strips any headers or trailers from the messages, assembles the Application Code and stores it in message buffer 40, as shown in step 102.

Either after or concurrently with steps 96 and 102 to obtain the Application Code, the SSPB 24 completes the process to establish a trunk connection between SubscriberA 14 and SubscriberB 16. The SSPB 24 responds to the ISUP message or IAM message sent by the SSPA 22 in step 102. The SSPB 24 transmits a set-up message to SubscriberB 16, which in response transmits an alert message to SSPB 24.

If SubscriberB 16 supports voice and data traffic, SSPB 24 returns an ACM message indicating voice and application call, and a trunk is established between SSPA 22 and SSPB 24 for the application and voice call between the two subscribers, as shown in step 104.

Once a connection is established, the parties to the call may thereafter communicate with each other through voice traffic or data traffic. The SSPB 24 downloads the Application Code associated with the specific application code to both SubscriberA 14 and SubscriberB 16 in step 106 through the trunk connection. If either SubscriberA 14 or SubscriberB 16 has no ISDN service, the Application Code may be downloaded using the phone doubler system or other means over ordinary POTS lines.

The Application Code is a subscriber defined application or program and may include an initiate application, as well as a communications protocol application and GUI application. The communications protocol establishes the parameters for the call connection, such as data rate and communication standard protocol, in order that SubscriberA 14 and SubscriberB 16 may communicate data traffic over the call connection. Again, the subscribers may communicate files and applications over the call connection using protocols ftp, tftp, rpc, or other file transfer protocol that both subscribers support. Preferably, the IN service designer specifies the protocol for subscribers to use and notifies the subscribers of the need to support the protocol. The GUI application is preferably an HTML file that indicates the display on computers 28 for SubscriberA 14 and SubscriberB 16. The GUI application may include links to other HTML files stored within the application database (AD) 38. In addition, the GUI application may be an HTML form file which can be processed by CGI scripts run by SCP 34,or the GUI application may include applications itself, such as JAVA applets, that are run by the computers 28.

These three applications, the initiate application, communication protocol, and GUI application, are only one example of applications which may be defined by a subscriber. Each service designer or network operator may determine how to present the applications to the subscribers and additional applications to download depending on the service and information that the subscribers want to communicate. A service provider, like ABC Airlines, may create and define their GUI applications or other applications to be stored in their application database and downloaded with the present invention. Again, the applications in the Application Code are preferably in an architecture independent language which may be run on different platforms. The computers 28 may include browsers or other software which can interpret the applications in the Application Code, or the computers 28 may have processors which can directly process the applications.

Once the Application Code is downloaded (to either SubscriberA 14 from subscriberB as in FIG. 3b or to both SubscriberA 14 and SubscriberB 16 from the SCP 34 in FIG. 3c), voice and data traffic is exchanged between the parties. Additional files or applications may be downloaded by the SCP 34 or by the data/application server of the called party. Data from the applications may optionally be stored on a local hard disk of the subscribers.

Though the above embodiment illustrates that the application may be within the control of the called party, a person of ordinary skill in the art would appreciate that the application may also be within the control of the calling party. The calling party would, as in the above embodiment, input the called party's number and an application code. The signaling network would determine that the requested application is within the control of the calling party and download an initiate application to the calling party rather than the called party over the trunk connection. It should be understood, however, that calling party control is not preferred due to the possibility of viruses and other forms of attack.

Figure 4:
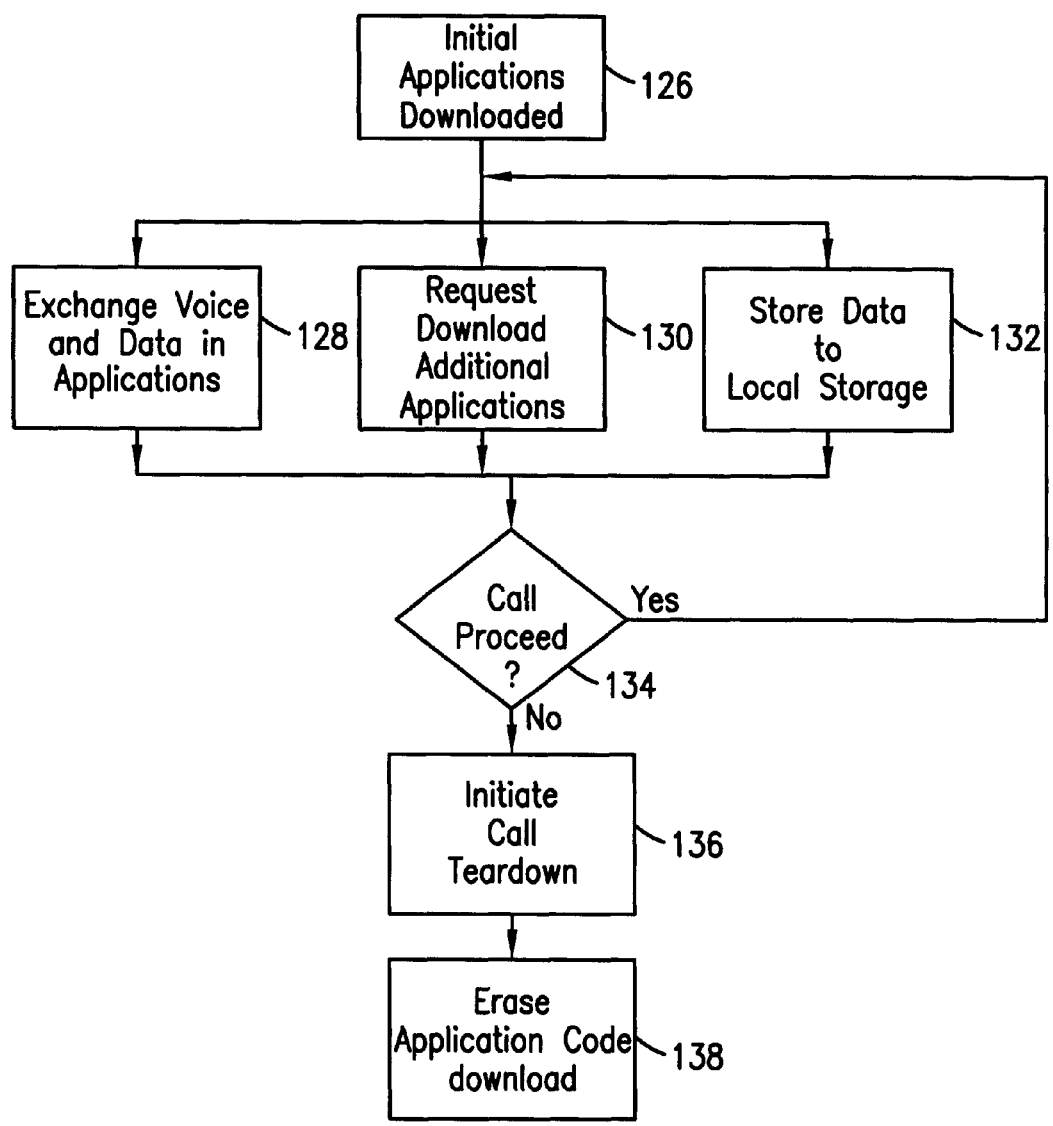
FIG. 4 illustrates a flow chart of the process of the present invention during a call in progress.

FIG. 4 illustrates the steps involved as the call proceeds after the downloading of the initial application codes to the parties to the call (step 126). Steps 128, 130, and 132 in FIG. 4 may occur asynchronously as necessary during the call. In step 128, the parties to the call exchange voice and data communication over the trunk connection concurrently using the backbone communication protocol application. The parties to the call may view the display generated by the GUI application while talking between themselves. The parties enter information or requested data in a form HTML or execute applications.

In an alternate embodiment, if an application/server 48 in SubscriberC 18 is processing multiple voice and application calls with a limited number of customer service representatives, application/server 48 may initially place a voice connection with SubscriberA 14 on hold. SubscriberA 14 may peruse the GUI application from the Application Code, submit data, request further files or applications from application/server 48 of SubscriberB 16, etc. When SubscriberA 14 needs assistance, SubscriberA 14 can then submit a request for a representative/voice connection using a link to a CGI or other application within the application/ data server 48. The application/data server 48 at SubscriberC 18 will process the request and place SubscriberA 14 in line to speak with a representative. When the next representative is available, the representative can take the voice connection off hold and speak and access the same application as SubscriberA 14.

In step 130, either party may request and download additional applications or files. The initial GUI application may include links to additional files or applications which the party can elect to download. Additional applications and files that are necessary for the execution of a requested application may be automatically invoked as well by the application.

When a need for an additional application arises (either when specifically requested by a party or when automatically requested by an application), the communication application automatically transmits a "Flash" and special code sequence identifying the application needed to the originating SSP. A flash is a midcall event that the IN network recognizes and informs the SCP to be prepared to collect digits. Applications communicating in the IN network use an IN protocol such as CS1 or AINO.1. The applications executing by the subscribers do not have to act in tandem or synchronously. The same applications need not be downloaded to both sides, but the service designer determines the applications needed by either party.

In step 132, the parties to the call may store data to a local hard disk. For example, SubscriberA 14 may store data from an HTML file to its hard disk or SubscriberB 16 may store data transmitted by SubscriberB 16, such as data from an HTML form file. The application/server 48 may also store information or the computer 28 itself may store information for SubscriberC 18.

In step 134, the parties to the call may continue by performing any of the steps 128, 130 or 132 in any sequence or either subscriber may proceed to terminate the call connection. In step 136, either party may proceed to call tear down, i.e., such as by hanging up the telephone 26 or entering a log-off key in the application on the computers 28. Alternatively, an application can be disconnected and a voice call continued, which would then be terminated by going on-hook.

For example, if SubscriberA 14 and SubscriberB 16 are in the midst of a voice/application call, SubscriberA 14 may hang up the phone 26 or log-off from the application. As a result, SubscriberA 14 transmits a Disconnect signal to SSPA 22. SSPA 22 then transmits an ISUP message Release to SSPB 24. In response, SSPB 24 transmits an ISUP Release Complete message to SSPA 22 and a Disconnect message to SubscriberB 16. The Disconnect message may include a termination application, as described below.

In response to receiving the Disconnect message, SubscriberB transmits a Release message to SSPB 24 which acknowledges the Release message with a Release complete message. This terminates the line 17. Concurrently with the termination of line 20, the trunk 44 connection is terminated upon receipt of the release complete message by SSPA 22. SSPA transmits a release message to SSPA 14 which may include a termination application. The termination application erases any application code downloaded during the call session from the random access memory (RAM) of computer 28 in SubscriberA 14, as shown in step 138. SubscriberA 14 transmits a Release Complete message to the SSPA 14 and the connection on line 18 is terminated. Alternatively, the termination application may be downloaded with the Trigger Packet or be automatically requested during step 136 by the backbone communication application in a disconnect message to the SSP.

Some example applications which may be implemented by the present invention include information lines, such as account information for a credit card company. Typically, a credit card company requests an input of the credit card number, zip codes and/or social security number during inquiries for account information. Due to the increased security of a telephony network, a person will input their credit card number to their credit card company in a normal voice call over a PSTN network but would not transmit their credit card number, or social security number, over the Internet. By downloading applications over the telephony network, the same security may now be achieved in accordance with the system and methodology of the present invention, such that a caller may transmit credit card number and other confidential information onto a form HTML file. The caller may also speak with a customer representative to inquire about the account information to which both parties may now easily view over a more secure network.

Another example of the implementation of the improvement of the present invention is a caller requesting flight information and reservations. Currently, over the telephony network in a normal voice call, a caller must inquire as to individual times of flights, availability and price. With the present invention, however, the airlines may download to the caller's computer, through the telephony network, a list of times and availability for the requested days and price information. This would greatly increase the efficiency of the communication by providing more information more quickly to the caller. The caller may then request further details of a particular flight or additional schedules through the application and ask further questions to a sales representative. When sales representatives are not readily available, however, the airlines may elect to first place the voice connection on hold while the caller is browsing the applications. The caller may then request communication with a sales representative upon deciding upon the flight times and price or if questions arise. Alternatively, an HTML form file may be transmitted by the airlines for the caller to input the flight reservation and credit card information. Again, due to the increased security of the telephony network provided by the present invention, callers may provide such confidential information over a given telephony network with less security risks than over the Internet. The airlines may then provide confirmation information, such as receipt, seat number, and flight schedule, in a HTML file to the caller which may be stored on the caller's local hard disk or printed. Other potential uses for the present invention include e-mail, document editor, spreadsheets, home shopping, business information, financial information, and schedules, such as for movie theaters, to name a few.

The present invention thus provides means to invoke and download applications, such as HTML files, data files, or programs, over a telephony network while maintaining a voice connection. This provision of applications over a telephony network has the advantage of increased security over the Internet. The telephony network has distinct advantages over the Internet because it is seamless, supports network intelligence, is secure and highly reliable, is designed for circuit switched utlities, and is more readily available. Most homes have a connection to a telephony network while numerous homes do not yet have connections to the Internet. The development cost to implement the present invention is low as well. The changes to the existing telephony network are minimal with the present implementations of the IN network. The present invention allows a user to access a multitude of information and applications over the telephony network with increased security and only an inexpensive network computer while maintaining a voice connection with the other party.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A telephony network for providing an application call, comprising:
   at least one service switching point of the telephony network connected to a plurality of subscribers including a calling subscriber and a called subscriber; and
   a signaling network for providing signaling within the telephony network, said signaling network including:
      an application database for storing a multiplicity of applications;
      a service control point interfacing with said application database;
      a plurality of signaling transfer points in communication with said service control point, said at least one service switching point in communication with said service control point through said plurality of signaling transfer points;
      an intelligent network trigger table within said at least one service switching point for processing an application code input from a calling subscriber, said application code input by said calling subscriber when placing a telephone call, and said at least one service switching point receiving at least one application corresponding to said application code stored in said application database and transmitting the at least one application to at least one of said calling subscriber and said called subscriber; and
      circuit-switched channel between said calling party and said called party allocated by said at least one service switching point, said circuit-switched channel capable of supporting voice and data communications, said data communications occurring by execution of said at least one application.

2. A telephony network of claim 1, wherein said service switching point further includes an application buffer for storing applications received from said application database.

3. The telephony network of claim 2, wherein said service switching point receives an application code inputted by one of said subscribers and queries said service control point for an application associated with said application code.

4. The telephony network of claim 3, wherein said service control point further includes an application look-up table for locating said applications stored within said application database.

5. The telephony network of claim 4, wherein said application look-up table includes a data field for specific application codes associated with a unique application within said application database, and a data field for generic application codes associated with a plurality of applications within said application database.

6. The telephony network of claim 5, further including:
   an intelligent peripheral for collecting user dialed digits specifying a specific application code; and
   wherein said service control point requests said intelligent peripheral to collect said specific application code in response to receiving a generic code from said service switching point.

7. The telephony network of claim 6, further including a service data point connected to said switching control point wherein said service data point includes said application database.

8. The telephony network of claim 7, wherein said applications stored within said application database include subscriber defined applications.

9. The telephony network of claim 8, wherein said applications stored within said application database include an initiate application for initiating download of applications from one subscriber to another subscriber.

10. The telephony network of claim 9, wherein said voice and data switch in said local exchange communicates to said subscribers through lines capable of transmitting voice and data traffic.

11. The telephony network of claim 10, wherein said voice and data switch communicates voice traffic and applications stored in said application database concurrently to at least one of the subscribers through said lines.

12. The telephony network of claim 11, wherein said lines are digital lines.

13. A service data point for use in a telephony network, said telephony network having a multiplicity of subscribers, said service data point comprising:
    an application database for storing at least one application therein, each said at least one application having an associated application specific code, and
    downloading means for downloading a respective one of said at least one applications to a given one of said subscribers after said given subscriber inputs an associated application specific code, wherein said at least one applications stored in said application database comprises:
        subscriber specific applications; and
        initiate applications for initiating download of applications from one subscriber of the telephony network to another subscriber of the telephony network.

14. The service data point in claim 13, wherein said service control point includes an application look-up table for locating said respective at least one application within said application database.

15. The service data point in claim 14, wherein said application look-up table includes a first data field containing respective associated application specific codes for each of said at least one applications, and a second data field containing a plurality of generic application codes each associated with a plurality of said applications within said application database.

16. The telephony network according to claim 11, wherein said at least one service switching point includes a bank of modems for transmitting voice and data traffic over analog lines to a subscriber of the telephony network.

17. A method for providing a voice/application call over a telephony network, comprising the steps of:
    receiving an application code in the telephony network from a first calling party and receiving a telephone number of a second called party;
    determining whether the first calling party and the second called party have a dual capability of communicating in a voice/application call in the telephony network;
    in response to determining that the parties have the dual capability of communicating in a voice/application call, establishing a trunk connection between the parties;
    determining an application mode associated with the application code, a first mode corresponding to said application residing within the telephony network, and a second mode corresponding to said application being within control of one of the parties to the call;
    in response to determining that the application associated with the application code resides within the telephony network in said first mode, downloading an application associated with the application code from an application database in the telephony network to both the called party and the calling party over the trunk connection; and
    in response to determining that the application associated with the application code resides within control of the second called party to a call in said second mode, downloading to the second called party an initiate application that initiates downloading of the application to the other party over the trunk connection.

18. The method of claim 17, wherein the step of determining whether the first calling party and the second called party have the capability of communicating in a voice/application call in the telephony network, includes the steps of:
    accessing a first subscriber call record associated with the calling party to determine services subscribed to by the calling party and to determine physical capabilities of the calling party; and
    accessing a second subscriber call record associated with the called party to determine services subscribed to by the called party and to determine physical capabilities of the called party.

19. The method of claim 17, wherein the step of determining whether an application associated with the application code resides within the telephony network in a first mode or within control of one of the parties to the call in a second mode comprises the steps of:
    transmitting the application code received from the first calling party to a control point that interfaces with an application database; and
    receiving a response from said control point that indicates a specific code for the application and whether the application resides within the telephony network or within control of one of the parties to the call.

20. The method of claim 19, wherein the step of transmitting the application code includes transmitting an invoke message to the control point in a signaling system of the telephony network.

21. The method of claim 20, wherein the step of downloading an application associated with the application code from an application database in the telephony network to both the called party and the calling party over the trunk connection comprises the steps of:
    transmitting a message to the control point includes the specific code for the application;
    receiving the application in one or more responses from the control point;
    assembling the application received in the one or more responses in an application buffer; and
    downloading the application to both the calling party and the called party over the trunk connection.

22. The method of claim 19, wherein the step of downloading to the party with control of the application an initiate application that initiates downloading of the application to the other party over the trunk connection, comprises the steps of:
    transmitting a message to the control point that includes the specific code for the application;
    receiving the initiate application in one or more responses from the service control point;
    assembling the initiate application received in the one or more responses in an application buffer; and
    downloading the initiate application to the party with control of the application over the trunk connection.

23. The method of claim 17, further including the step of:
determining that the application code received from the calling party corresponds to a request for a voice/application call by accessing a trigger table.

24. The method of claim 23, further including the step of:
determining routing information for the telephone number of the called party.

25. A method of providing an application in a telephony network, comprising:
receiving an invoke message with an application code in a signaling system of the telephony network;
determining whether the application code is a specific code associated with an application;
in response to determining that the application code is not a specific code, obtaining the specific code associated with the application;
retrieving the application associated with the specific code in an application database in the telephony network; and
transmitting the application for downloading to subscribers to the telephony network, wherein said step of transmitting the application for downloading to subscribers to the telephony network comprises the step of transmitting one or more signaling messages to a service switching point in the signaling system of the telephony network.

26. The method of claim 25, wherein the step of determining whether the application code is a specific code associated with an application comprises:
accessing an application code database table which includes data fields specifying generic and specific codes corresponding to a plurality of applications; and
comparing the application code to the generic and specific codes for the plurality of applications.

27. The method of claim 26, wherein the step of obtaining the specific code associated with the application, comprises the steps of:
transmitting an instruction to an intelligent peripheral to query a caller for the specific code associated with the application.

28. The method of claim 27, wherein the step of retrieving the application associated with the specific code in an application database in the telephony network comprises the steps of:
accessing an entry in the application code database table corresponding to the specific code, wherein the entry includes a field specifying the address of the application in the application database;
accessing the application database at the address of the application.

29. A telephony network for providing simultaneous voice and data calls, comprising:
a signaling network for providing routing and signaling for said telephony network, said signaling network comprising:
an application database for storing a plurality of applications; and
a service switching point connected to a plurality of subscribers for receiving, from a calling subscriber, a B number of a called subscriber and an application code corresponding to at least one of said plurality of applications, said service switching point receiving at least one of said applications from said application database, and downloading said at least one application to at least one of said subscribers over a trunk connections, said application facilitating the data portion of said simultaneous voice and data call.

30. The telephony network of claim 29, wherein said service point is a service switching point in said telephony network, and said signaling network further includes a service control point that interfaces with said application database.

31. The telephony network of claim 30, wherein said service switching point further includes an application buffer for storing applications received from said application database.

32. The telephony network of claim 31, wherein said signaling system further includes a service data point that stores said application database.

33. The telephony network of claim 32, wherein said local exchange is connected to a plurality of subscribers over lines capable of transmitting voice and data traffic.

34. The service data point according to claim 13, wherein said service data point is in communication with a service control point, said service control point providing an interface with a signaling transfer point.

35. The service data point according to claim 34, wherein said service data point is stored within said service control point.

* * * * *